United States Patent
Baldi et al.

(10) Patent No.: US 9,191,199 B2
(45) Date of Patent: Nov. 17, 2015

(54) METHOD AND APPARATUS FOR PUBLIC-KEY CRYPTOGRAPHY BASED ON ERROR CORRECTING CODES

(75) Inventors: Marco Baldi, Macerata (IT); Marco Bianchi, Fanu (IT); Franco Chiaraluce, Osimo (IT); Joachim Jakob Rosenthal, Zollikon (CH); Davide Mose' Schipani, Zurich (CH)

(73) Assignee: UNIVERSITAT ZURICH, Zurich (CH)

( * ) Notice: Subject to any disclaimer, the term of this patent is extended or adjusted under 35 U.S.C. 154(b) by 0 days.

(21) Appl. No.: 14/110,448

(22) PCT Filed: Apr. 2, 2012

(86) PCT No.: PCT/EP2012/056005
§ 371 (c)(1),
(2), (4) Date: Dec. 9, 2013

(87) PCT Pub. No.: WO2012/139919
PCT Pub. Date: Oct. 18, 2012

(65) Prior Publication Data
US 2014/0105403 A1     Apr. 17, 2014

(30) Foreign Application Priority Data

Apr. 9, 2011  (CH) ...................................... 0635/11
Jul. 7, 2011  (CH) ...................................... 1140/11

(51) Int. Cl.
*H04L 9/08* (2006.01)
*H04L 9/30* (2006.01)

(52) U.S. Cl.
CPC ............ *H04L 9/0819* (2013.01); *H04L 9/0861* (2013.01); *H04L 9/304* (2013.01)

(58) Field of Classification Search
CPC ...... H04L 9/0861; H04L 9/0819; H04L 9/304
See application file for complete search history.

(56) References Cited

U.S. PATENT DOCUMENTS

2002/0106087 A1* 8/2002 Lotspiech et al. ............ 380/278
2010/0031021 A1* 2/2010 Arnold et al. ................. 713/155
2013/0326315 A1* 12/2013 Elia et al. ...................... 714/785

OTHER PUBLICATIONS

Bernstein et al, "Attacking and Defending the McEliece Cryptosystem", Oct. 17, 2008, Post-Quantum Cryptography; pp. 31-46.
Baldi et al: "A New Analysis of the McEliece Cryptosysem Based on QC-LCPC Codes", Security and Cryptography for Networks; Sep. 10, 2008, pp. 246-262.

* cited by examiner

*Primary Examiner* — Amir Mehrmanesh
(74) *Attorney, Agent, or Firm* — JMB Davis Ben-David

(57) ABSTRACT

Methods and apparatus for generating a private-public key pair, for encrypting a message for transmission through an unsecure communication medium (30), and for decrypting the message are disclosed. The methods are based on the well-known McEliece cryptosystem or on its Niederreiter variant. More general transformation matrices Q are used in place of permutation matrices, possibly together with an appropriate selection of the intentional error vectors. The transformation matrices Q are non-singular n×n matrices having the form Q=R+T, where the matrix R is a rank-z matrix and the matrix T is some other matrix rendering Q non-singular. The new Q matrices, though at least potentially being dense, have a limited propagation effect on the intentional error vectors for the authorized receiver. The use of this kind of matrices allows to better disguise the private key into the public one, without yielding any further error propagation effect. Based on this family of Q matrices, the presently proposed cryptosystem enables the use of different families of codes than Goppa codes, such as RS codes, by ensuring increased public key security.

14 Claims, 3 Drawing Sheets

METHOD AND APPARATUS FOR PUBLIC-KEY CRYPTOGRAPHY BASED ON ERROR CORRECTING CODES

CROSS-REFERENCE TO RELATED APPLICATIONS

This is the U.S. National Stage of International Application No. PCT/EP2012/056005, filed Apr. 2, 2012, which was published in English under PCT Article 21(2), which in turn claims the benefit of Switzerland Patent Application Nos. 0635/11, filed Apr. 9, 2011; and 1140/11, filed Jul. 7, 2011.

TECHNICAL FIELD

The present invention relates to methods for public-key cryptography based on error correcting codes, and to corresponding encryption and decryption apparatus.

PRIOR ART

The McEliece cryptosystem, proposed in 1978[1], is one of the most promising public-key cryptosystems able to resist attacks based on quantum computers. This is due to the fact that, in contrast to cryptosystems exploiting integer factorization or discrete logarithms, the McEliece cryptosystem relies on the hardness of decoding a large linear block code without any visible structure [2].

The original McEliece cryptosystem is illustrated in FIG. 1. Suppose that a legitimate transmitter, in the following referred to as "Alice", wants to transmit a message in encrypted form through an unsecure communication medium to a legitimate receiver, in the following referred to as "Bob".

Bob's private key is represented by a set of three binary matrices (S, G, P). Matrix G is the k×n generator matrix of a binary (n, k) Goppa code able to correct t errors; matrix S is a randomly chosen dense k×k transformation matrix; and matrix P is an n×n permutation matrix. Bob publishes a public key (G', t) consisting of the matrix product $G'=S^{-1} \cdot G \cdot P^{-1}$ and the number t.

Alice encrypts the message by generating a binary cleartext vector u of length k representing the cleartext message, computing the product of vector u by matrix G', and adding an error vector e representing t intentional errors, to obtain a ciphertext vector x=u·G'+e. Alice now transmits the ciphertext vector x to Bob through the unsecure communication medium. For decrypting the message, Bob multiplies the ciphertext vector by the permutation matrix P, decodes the resulting vector, and descrambles the result by multiplication with matrix S.

The McEliece cryptosystem has resisted cryptanalysis for more than thirty years. No polynomial-time attack able to break it has been devised up to now. However, the increased computing power and the availability of optimized attack procedures have required to update its original parameters [3].

The main advantage of the McEliece cryptosystem consists in its fast encryption and decryption procedures, which require a significantly lower number of operations with respect to alternative solutions (like, for example, RSA). However, the original McEliece cryptosystem has two main disadvantages, that are low code rate and large key size, both due to the binary Goppa codes it is based on. When adopting Goppa codes, a first improvement is obtained through the variant proposed by Niederreiter [4], which uses parity-check matrices instead of generator matrices.

A significant improvement in regard to the code rate and the key size would be obtained if other families of codes could be included in the system. In particular, the use of codes like Reed-Solomon (RS) codes could yield significant advantages. In fact, for any choice of their parameters, RS codes are maximum distance separable codes, which ensures that they achieve maximum error correction capability at each code rate. In the framework of the McEliece cryptosystem, this translates into having shorter keys for the same security level, or a higher security level for the same key size, with respect to binary Goppa codes having the same code rate.

However, many attempts of replacing Goppa codes with other families of codes have exposed the system to security threats [5], [6], often exploiting the fact that the public code is permutation-equivalent to the secret code. Some recent proposals based on Quasi-Cyclic and Quasi-Dyadic codes have also been broken [7]. Low-Density Parity-Check (LDPC) codes, in principle, should be able to offer high design flexibility and compact keys. However, also the applicability of such a class of codes may expose the system to dangerous flaws [8], [9].

Nevertheless, it is still possible to exploit Quasi-Cyclic (QC) LDPC codes to design a variant of the system that is immune to any known attack [10]. The main idea adopted in Ref. [10] is to replace the permutation matrix P of the original McEliece cryptosystem with a more general type of transformation matrix Q to better hide the secret code within the public key. The matrix Q used in Ref [10], for the QC-LDPC-based version of the McEliece cryptosystem, is a sparse matrix. In such a system, the (low) density of Q must be chosen as a trade-off between two opposite effects: i) increasing the density of the public code parity-check matrix in such a way that it is too difficult to search for low weight codewords in its dual code and ii) limiting the propagation of the intentional errors in such a way that they are still correctable by the legitimate receiver.

Other solutions for increasing key security have been adopted in the past, such as using a distortion matrix together with rank codes in the GPT cryptosystem [11] and exploiting the properties of subcodes in variants of the McEliece and the GPT cryptosystems [12]. Unfortunately, cryptanalysis has shown that such approaches exhibit security flaws [5], [6].

In a variant of the GPT cryptosystem adopting a column scrambler [13], [14], as well as in cryptosystems based on full decoding [15, sec. 8.3], [16], permutation matrices have been replaced with more general transformation matrices. However, in order to preserve correctability of the intentional error vectors, the GPT cryptosystem must work in the rank metric domain and adopts rank distance codes, such as Gabidulin codes. Unfortunately, the properties of Gabidulin codes make it possible to exploit the behavior of the public generator matrix under the Frobenius automorphism in order to mount a polynomial-time attack also against this version of the GPT cryptosystem [5].

The main idea behind full decoding cryptosystems is to let the intentional error vectors have any arbitrary weight. This way, an attacker would be forced to try full decoding of the public code, that is known to be an NP-complete task. Obviously, the legitimate receiver must be able to decode any intentional error vector with reasonable complexity; so, the problem of full decoding must be transformed from a one-way function to a trapdoor function. For this purpose, the main idea is to use a transformation that maps a set of error vectors with weight ≤t (the maximum number of errors that can be corrected by the secret code) into a set of arbitrary weight intentional error vectors.

The set of intentional error vectors used in full decoding cryptosystems does not coincide with the set of correctable error vectors (nor with a subset of it), but instead is a transformed version of it. In order to exploit the full decoding problem, only those error vectors that can be anti-transformed into correctable error vectors must be used for encryption. So, some information on the transformation used to originate them must be disclosed. The first instances of full decoding cryptosystems have been proved to reduce their security to that of the original McEliece cryptosystem, such that an attacker does not have to attempt full decoding, but only normal decoding.

In more efficient variants [15], [16], a generator matrix of a maximum distance-t anticode is used to hide the secret transformation. This way, after inverting the secret transformation, the error vector is multiplied by such a generator matrix and remains correctable for the legitimate receiver. However, the construction based on anticodes might be quite unpractical.

SUMMARY OF THE INVENTION

It is an object of the present invention to provide encryption and decryption methods of the McEliece type or of the type of the Niederreiter variant which are capable of improving the security level of a cryptosystem without increasing the public key size, or, equivalently, capable of using a shorter public key for a given security level. In this document, the term "cryptosystem" is to be understood as relating to both a method of encryption and a corresponding method of decryption.

This object is achieved by each of the following: a method for encrypting a message according to claim 1, and a method for decrypting a message according to claim 6.

It is a further object of the present invention to provide corresponding devices for key generation, encryption and decryption. This object is achieved by each of an encryption apparatus according to claim 22, a key generating apparatus according to claim 26, and a decryption apparatus according to claim 27.

The invention further relates to a computer program product according to claim 21.

Advantageous embodiments of the invention are laid down in the dependent claims.

The encryption method of the present invention comprises the following steps:

receiving a public key, the public key comprising at least a first part, the first part being a representation of a transformed (n, k) linear block code with length n and dimension k over a finite field GF(p), k, n and p being positive integers, obtainable from a private (n, k) linear block code over GF(p) by a transformation using a non-singular scrambling matrix S and a non-singular n×n matrix Q having the form $Q=R+T,$ where the matrix R is a rank-z matrix, and the matrix T is some other matrix rendering Q non-singular, the matrices S, R and T having elements in GF(p); wherein k and n are positive integers and z is a positive integer with z<n;

generating an error vector e having elements in GF(p), having a predetermined weight t; and encrypting a cleartext message represented by a cleartext vector u having elements in GF(p) to obtain a ciphertext vector x, wherein said encryption involves application of said transformed block code under use of said error vector e.

The main difference between the proposed cryptosystem and known variants of the McEliece cryptosystem consists in the way the private generator matrix is disguised into the public one, that is, by using a more general transformation matrix Q in place of the permutation matrix. This may be combined with an appropriate selection of the intentional error vectors, as explained below. The present invention can be regarded as an improvement of the approach of reference [10], which discloses a QC-LDPC-based version of the McEliece cryptosystem, by introducing a more effective class of Q matrices and by generalizing their form also to the non-binary case. The new Q matrices, though at least potentially being dense, have a limited propagation effect on the intentional error vectors.

The use of this kind of matrices allows to better disguise the private key into the public one, without yielding any further error propagation effect. Based on this family of Q matrices, the presently proposed cryptosystem enables the use of different families of codes other than Goppa codes, such as RS codes, by ensuring increased public key security. In contrast to the GPT cryptosystem, the proposed solution is still able to exploit Hamming distance codes. In a variant of the present invention, the key-generation, ciphering and deciphering functions are realized by implementing a Niederreiter variant [4] of the present cryptosystem, that is, by using a parity-check matrix in the place of a generator matrix and by associating the cleartext message to an error vector rather than to a codeword. The use of a Niederreiter variant of the present invention can help reducing the public key size.

The public key may further comprise the weight t of the error vector (in other words, the number of intentional errors to be added during encryption, which is preferably identical to the maximum number of errors which can be corrected by the linear block code). The method may include transmitting said ciphertext vector x through said communication medium by any suitable means.

If encryption is done in a similar manner as in the original McEliece scheme, the first part of the public key will be a k×n generator matrix G' of the transformed block code taking the form $G'=S^{-1}\cdot G\cdot Q^{-1},$ where the scrambling matrix S is a non-singular k×k matrix, and the matrix G is a k×n systematic generator matrix of the private (n, k) linear block code, the matrix G having elements in GF(p).

The ciphertext vector is then obtained from the cleartext vector by carrying out the following operation:

$x=u\cdot G'+e.$

If encryption is carried out in a similar manner as in the Niederreiter variant, the first part of the public key will be an r×n parity-check matrix H' of the transformed block code of the form $H'=S^{-1}\cdot H\cdot Q^T,$ where the scrambling matrix S is a non-singular r×r matrix, with r=n−k, and the matrix H is an r×n parity-check matrix of the private (n, k) linear block code, the matrix H having elements in GF(p).

The ciphertext vector x is then obtained from the cleartext vector by mapping the cleartext vector into a weight t error vector e and calculating its syndrome x through H' according to $x=H'\cdot e^T.$ The method may be complemented by decryption to obtain a complete cryptosystem. The method then further comprises:
- receiving the ciphertext vector x from the communication medium; and
- decrypting the ciphertext vector x by using a private key comprising the private linear block code.

The decryption method of the present invention comprises the following steps:
- obtaining a private key comprising a representation of a private (n, k) linear block code over a finite field GF(p), p, k and n being positive integers, a non-singular scrambling matrix S and a non-singular n×n matrix Q having the form $$Q=R+T,$$

the matrix R being a rank-z matrix, z being a positive integer with z<n, and the matrix T being some other matrix rendering Q non-singular, the matrices S, R and T having elements in GF(p);
- receiving a ciphertext vector x from the communication medium, the ciphertext vector x being obtainable from a cleartext vector u representing the message, u having elements in GF(p), by applying a public key comprising at least a first part, the first part being a representation of a transformed (n, k) linear block code obtainable by a transformation of said private linear block code using said matrix Q; and
- decrypting said ciphertext vector x to obtain the cleartext vector u by using said private key.

In the case where encryption was carried out in a similar manner as in the original McEliece scheme, the representation of the private (n, k) linear block code takes the form of a k×n systematic generator matrix G, and the scrambling matrix S has size k×k.

The first part of the public key then is a transformed generator matrix G' having the form $$G'=S^{-1} \cdot G \cdot Q^{-1},$$

and the ciphertext vector x is obtainable by the following operation:

$$x=u \cdot G'+e,$$

wherein e is an error vector having elements in GF(p), having a predetermined weight t.

Decryption of said ciphertext vector x is then carried out by multiplying the ciphertext vector x with the matrix Q to obtain a product vector, decoding the product vector (or a vector derived from the product vector, such as the sum of the product vector with some other vector) with the private linear block code to obtain an information vector, and multiplying the information vector with the matrix S to obtain the cleartext vector u.

In the case where encryption was carried out in a similar manner as in the Niederreiter variant, the representation of the private (n, k) linear block code takes the form of an r×n parity-check matrix H, and the scrambling matrix S has size r×r.

The first part of the public key then is a transformed r×n parity-check matrix $$H'=S^{-1} \cdot H \cdot Q^{T};$$

and the ciphertext vector x is obtainable from the cleartext vector u by mapping the cleartext into a weight t error vector e and calculating its syndrome x through H' according to $$x=H' \cdot e^{T},$$

wherein e is an error vector with elements in GF(p), having a predetermined weight t.

Decryption of said ciphertext vector x is then carried out by multiplying the matrix S by the ciphertext vector x to obtain a product vector, performing syndrome decoding on the product vector (or on a vector derived from the product vector, such as the sum of the product vector with some other vector) with the private linear block code to obtain an error vector, multiplying the error vector by a matrix $(Q^T)^{-1}$ and demapping the resulting vector into its associated cleartext vector u.

The public key may further comprise a second part, the second part representing z error constraints, z being a positive integer with z<n. The error vector is then selected to fulfil said z error constraints. In the case of encryption similar to the original McEliece scheme, the error vector e may be selected by randomly choosing t—z random errors and generating z further errors from the randomly chosen t—z errors and the set of z error constraints.

In some embodiments, the error constraints may be equivalent to a condition e·R=0. In particular, the rank-z matrix R may be formed as a product of two z×n matrices, a and b, according to the formula $R=a^T \cdot b$. Then the matrix a represents the z error constraints, the error constraints being expressed by the condition $a \cdot e^T=0$, and the second part of the public key may be the matrix a.

In more general terms, the rank-z matrix R may be derived from two z×n matrices, a and b, in another manner than by the above formula $R=a^T b$. Still, the matrix a should then represent the z error constraints, the error constraints being equivalent to the condition $a \cdot e^T=\gamma$, with $\gamma \in GF(p)$. In particular embodiments, γ may take the value 0 or 1.

In a preferred embodiment, $a=a_1+a_2$ with $a_1$ and $a_2$ being two z×n matrices, and $$R = \begin{bmatrix} a_1 \\ a_2 \end{bmatrix}^T \cdot \begin{bmatrix} b \\ 1-b \end{bmatrix},$$

where 1 is the all-one z×n matrix.

In these methods, the matrix a is either kept secret, or it may be published as the second part of the public key.

The invention also relates to a method of generating a private and a public key (a key pair) for encryption and decryption, respectively, with keys as described above, and wherein the public key is made publicly available by any suitable method.

The matrix T is preferably a sum of m generalized permutation matrices $\Pi_i$, i=1, ..., m, m being a positive integer, each generalized permutation matrix $\Pi_i$ having only one non-zero element in each row and column, whose value is selected among the p−1 non-zero elements of GF(p).

In a preferred embodiment of the present invention, linear block codes having Quasi-Cyclic (QC) nature are used. In such case, n and k are multiple of an integer q (n=$n_0$× q, k=$k_0$×q) and matrices S, R, T and, where applicable, G or H are formed by circulant sub-matrices with size q×q, a circulant matrix being a square matrix in which each row is obtained through a rightwards cyclic shift of the previous row by one position. The use of QC codes can help reducing the size of the public key. In case QC codes are used, the error constraints may apply on q-symbol sub-vectors of the error vector e, rather than on the whole vector.

The proposed methods are applicable for finite fields (Galois fields) of any order p, including the binary case p=2.

The methods are preferably implemented on a computer, and the invention accordingly also provides a computer program product comprising computer program code for carrying out the method of any of the preceding claims when the computer program code is executed on a computer. The term "computer program product" is to be understood broadly as any form of software (source code, object code or executable code) made available on any type of physical medium (e.g., CD-ROM, DVD-ROM, hard disk, flash memory, or any other type of memory device), or through a network such as the internet (e.g., stored on an FTP or HTTP server accessible through the Internet). Since decryption is normally carried out at a different location than encryption, the encryption and decryption methods may be employed independently and may be implemented in separate computer programs.

The present invention further provides an encryption apparatus for encrypting a message for transmission through a communication medium in encrypted form, the apparatus comprising:
a public-key receiving module configured to receive a public key, the public key comprising a first part and optionally a second part, wherein the first part represents a k×n matrix G' having elements in GF(p), k and n being positive integers, and wherein the optional second part comprises z error constraints, z being a positive integer with z<n;
an error-selection module configured to select an error vector e having elements in GF(p), the error vector e having a predetermined weight t and fulfilling said z error constraints (when they are publicly available); and
a ciphertext-generating module configured to encrypt a message represented by a cleartext vector u having elements in GF(p) by carrying out the following operation:

$$x = u \cdot G' + e,$$

so as to obtain a ciphertext vector x representing the encrypted message.

The apparatus may further comprise a transmitter configured to transmit said ciphertext vector x through said communication medium. The transmitter may be implemented, e.g., as an e-mail client for sending an e-mail message through a network such as the Internet, or as a wireless transmitter in a mobile telecommunication system.

The present invention further provides a key generation apparatus for generating the private key and its corresponding public key and a decryption apparatus for decrypting a ciphertext message into a cleartext message implementing the above methods.

The apparatus may be implemented in hardware (e.g., as a dedicated processor) or at least partially in software on a general-purpose computer having a processor for carrying out the specified steps and a memory for storing appropriate data structures (matrices, vectors and numbers as mentioned above).

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

General Concept

Figure 1:
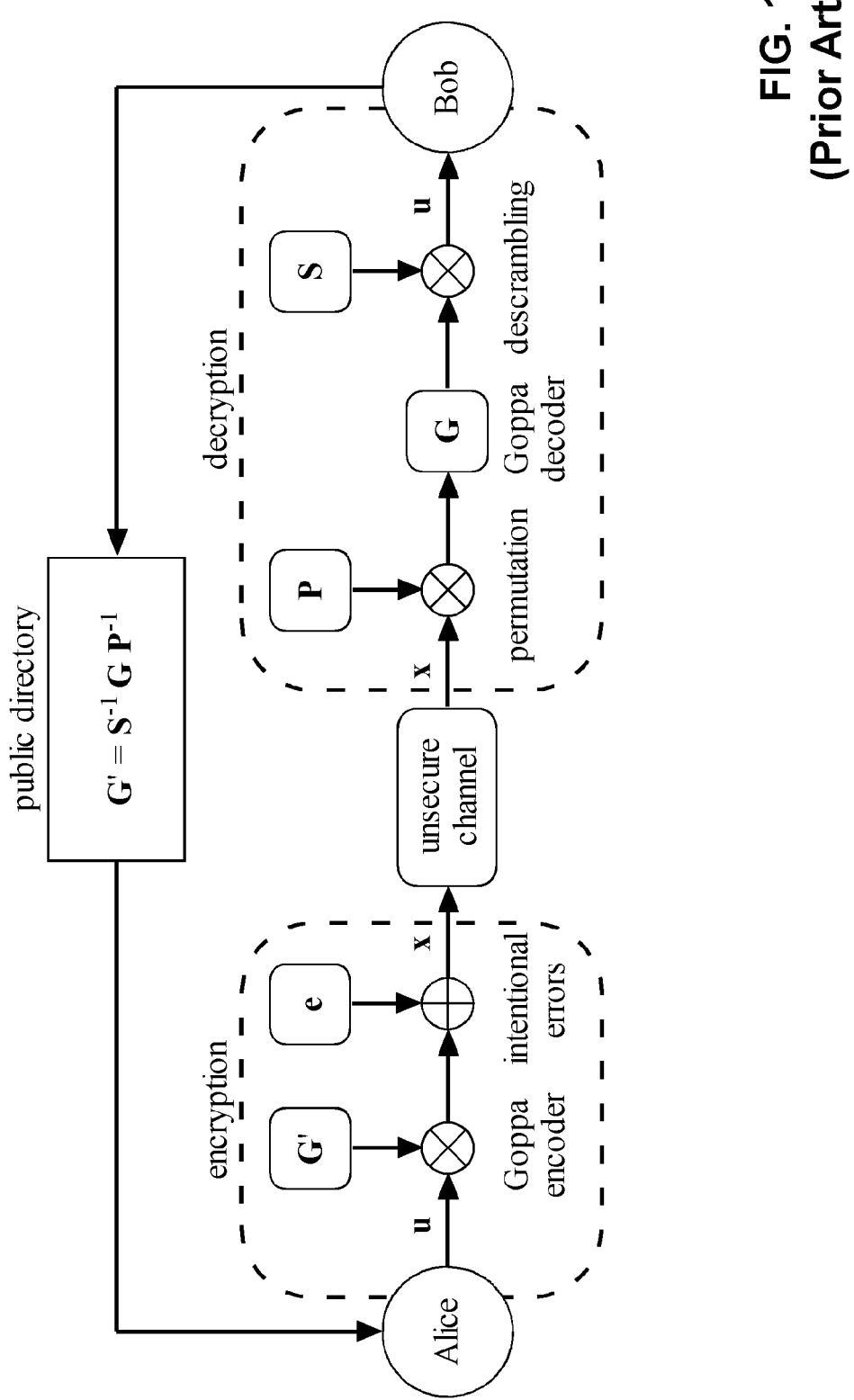
FIG. 1 illustrates the classical McEliece cryptosystem known from the prior art.
Figure 2:
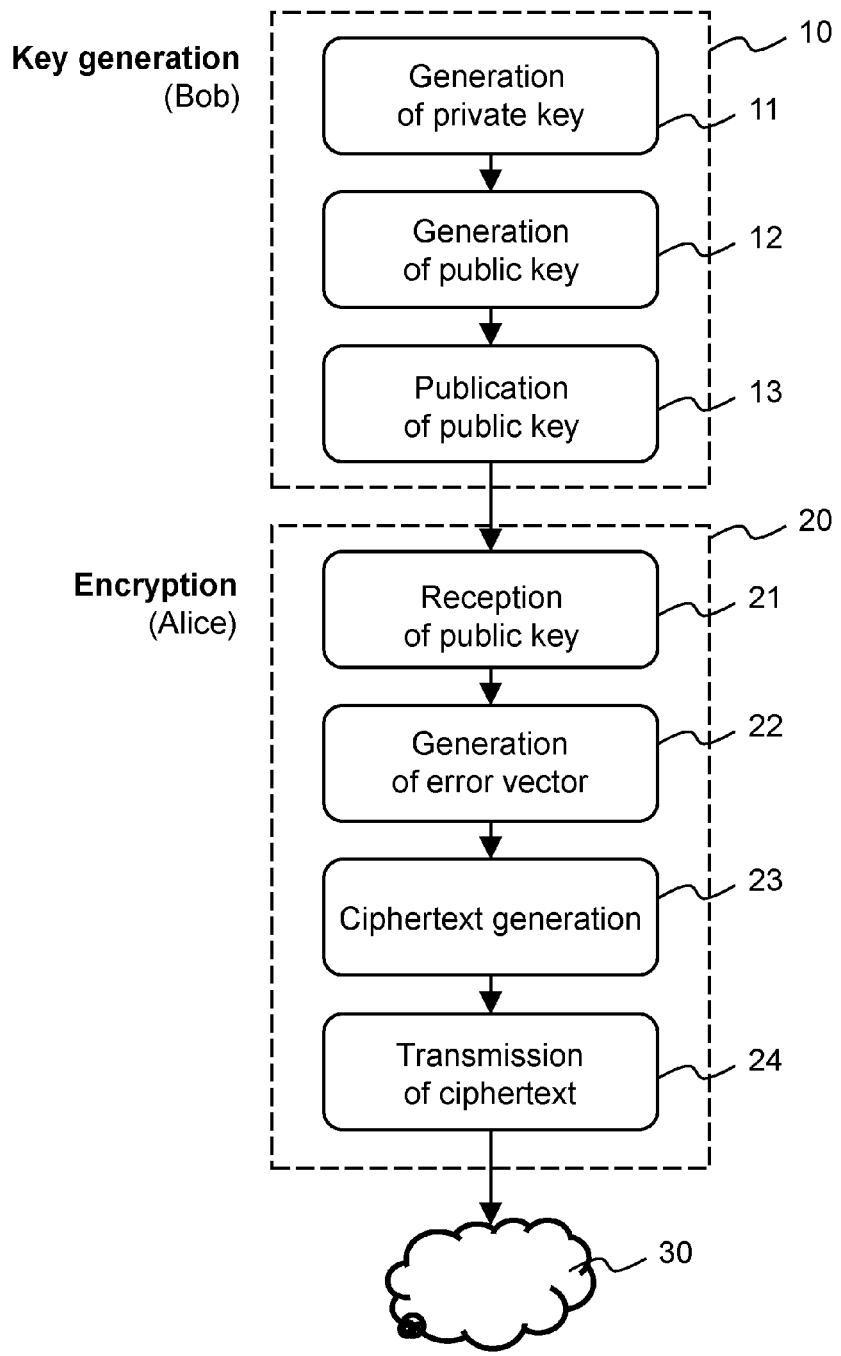
FIG. 2 illustrates key generation and encryption in a preferred embodiment of the present invention.
Figure 3:
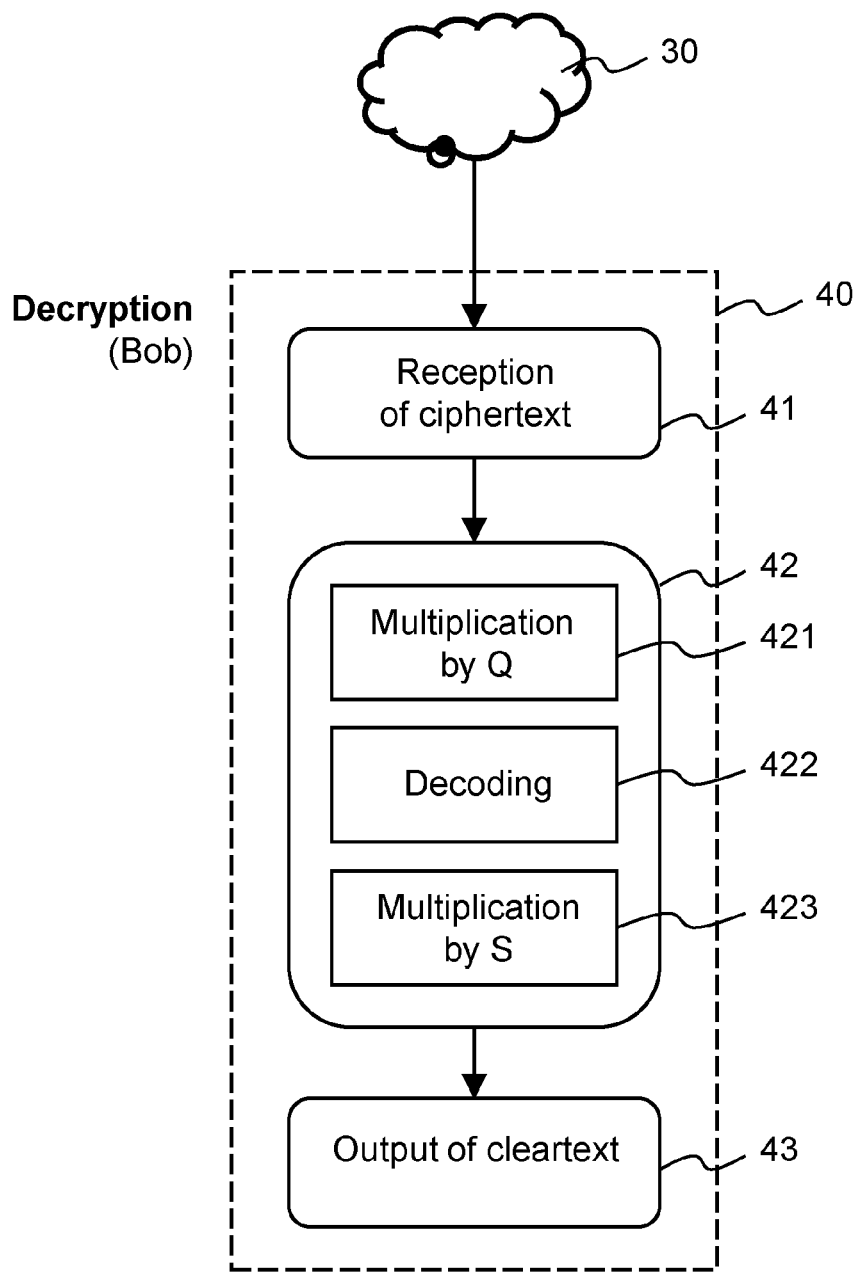
FIG. 3 illustrates decryption in a preferred embodiment of the present invention.

A preferred embodiment of the present invention is explained in the following with reference to FIGS. 2 and 3.

Bob operates a key generating apparatus 10. This apparatus comprises a private-key generating module 11 to generate Bob's private (secret) key in the form of three matrices. One of these matrices is a k×n systematic generator matrix G of a linear block code (code length n, code dimension k and capability to correct t errors) defined over GF(p). The other two matrices are a k×k non-singular scrambling matrix S and an n×n non-singular transformation matrix Q.

A public key is then generated in a public-key generating module 12. The public key comprises two parts: a k×n matrix of the form $$G' = S^{-1} \cdot G \cdot Q^{-1}, \quad (\text{Eq. 1})$$

and optionally includes a set of error constraints as will be explained below. In general, in contrast to the original McEliece cryptosystem, the public code is not permutation-equivalent to the private code due to a specific choice of Q, as will also be explained below.

Bob publishes the public key in a suitable format with a publication module 13. This module may comprise an e-mail sending device to communicate the public key to selected users, a public directory accessible through the Internet or through any other network by protocols such as HTTP or FTP, or any other means to distribute the public key to potential transmitters of encrypted information.

Alice encrypts a message represented by a cleartext vector u by using an encryption apparatus 20. To this end, a key receiving module 21 obtains Bob's public key. An error-generation module 22 produces an error vector e, which is a 1×n vector of t intentional errors that may be subject to the error constraints optionally included in the public key, as explained further below. A ciphertext-generating module 23 then applies the following encryption map:

$$x = u \cdot G' + e, \quad (\text{Eq. 2})$$

where x is a ciphertext vector corresponding to the cleartext u. The ciphertext is then transmitted by a transmitter 24 through an unsecure communication medium 30, as, for example, through the Internet or through a wireless communication link, or stored onto a storage medium, as, for example, a hard disk or flash storage device. The communication medium 30 may be the same as the one through which the public key was transmitted, or it may be a different medium.

Bob receives and decrypts the message with a decryption apparatus 40. The decryption apparatus 40 comprises a receiver 41 for receiving the ciphertext vector from the communication medium 30. A cleartext deciphering module 42 reconstructs a cleartext vector u from the ciphertext vector x by sending the ciphertext vector to a first multiplication submodule 421, which inverts the transformation as follows:

$$x' = x \cdot Q = u \cdot S^{-1} \cdot G + e \cdot Q, \quad (\text{Eq. 3})$$

thus obtaining a product vector x' representing a codeword of the secret code affected by the error vector e·Q. A decoding submodule 422 will then decode the product vector, correcting all the errors, and get u·S$^{-1}$, due to the systematic form of G. Error correction of this type is well known in the prior art and will depend on the linear block code which is actually employed. A second multiplication submodule 423 then multiplies $u \cdot S^{-1}$ by S to obtain the reconstructed cleartext vector u. This vector is then outputted in a suitable form by an output module 43.

Choice of Q and Selection of the Intentional Error Vectors

In general, the use of a transformation matrix Q in place of a permutation matrix causes an error propagation effect. However, if Q is chosen within a given class of matrices, this effect can be controlled or even eliminated. This can be achieved by giving Q the following form:

$$Q=R+T,\qquad\text{(Eq. 4)}$$

with R a (preferably dense) n×n matrix having rank z<n and T a (preferably sparse) n×n matrix such that Q is non-singular. The optional error constraints minimizing the error propagation can then be expressed as $e \cdot R=0$.

In this case, when implementing decryption, Bob experiences a residual error vector $e \cdot Q = e \cdot T$. A possible form for R is the following:

$$R=a^T \cdot b,\qquad\text{(Eq. 5)}$$

where a and b are two random z×n matrices and $^T$ denotes transposition. In this case, the intentional error vectors should be restricted to only those vectors satisfying the condition $a \cdot e^T=0$, and the matrix a should be disclosed as the second part of the public key.

In order to increase the system security, the error constraints can be omitted from the public key. In this case, no selection of the intentional error vectors is performed and the product $e \cdot R$ can assume whatever value. In order to successfully complete decryption, the value of $e \cdot R$ can be found by the legitimate receiver by first guessing it and then performing a set of iterated decryption attempts, until one of them succeeds.

As far as matrix T is concerned, a possible form for it is the following:

$$T=\sum_{i=1}^{m}\Pi_i,\qquad\text{(Eq. 6)}$$

where each $\Pi_i$ is a generalized permutation matrix, having only one non-zero element in each row and column, whose value is randomly selected among the p−1 non-zero elements of GF(p). This gives a matrix T with, at most, m non-zero elements in each row and column.

The usage of T as in (Eq. 6) leads to an increase in the number of intentional errors by (at most) a factor m. Such controlled error propagation effect can be compensated by Bob by using codes with a high error correction capability, like LDPC codes [10].

Use of Quasi-Cyclic Codes

In order to reduce the amount of storage needed for representing the public key, linear block codes having Quasi-Cyclic nature can be used in the present invention. In such case, n and k are multiple of an integer q (n=$n_0$×q, k=$k_0$×q) and matrices S, G, R, T are formed by circulant sub-matrices with size q×q.

When QC codes are adopted, the design of matrices R and T can be performed block-wise, still aiming at obtaining a full-rank matrix Q=R+T. Suitable circulant matrices and circulant permutation matrices can be designed to form the blocks of matrices R and T, so ensuring the QC nature of matrix Q, that, together with that of S and G, suffices to obtain a public key G' in QC form.

In such case, G' can be represented by only storing the first row (or column) of each one of its circulant blocks; so, the key length is reduced with respect to the use of non-QC codes and it increases linearly with the code length.

When using QC codes, the optional set of constraints on the intentional error vectors can be imposed block-wise, in such a way that each q-bit sub-vector of an error vector must verify one or more error constraints.

Design Issues

In a simplified embodiment, obtained by using R and T matrices that are special cases of equations (5) and (6), the matrix Q takes the following form:

$$Q_1=R+P_1,\qquad\text{(Eq. 7)}$$

where $$R=a^T \cdot b=[a_1 a_2 \ldots a_n]^T \cdot [b_1 b_2 \ldots b_n]\qquad\text{(Eq. 8)}$$

is a rank-1 matrix and $P_1$ is a permutation matrix.

In the choice of $Q_1$ it is preferred to avoid some special cases which could allow an attacker to obtain a code that is permutation-equivalent to the secret one, thus bringing security back to that of the classical McEliece cryptosystem.

Suppose the j-th element of b is zero and that $P_1$ has a symbol 1 at position (i, j). In this case, the j-th column of $Q_1$ is completely null, except for its element at row i. Since $Q_1^{-1} = \hat{Q}_1 / |Q_1|$, where $\hat{Q}_1$ is the adjoint matrix and $|Q_1|$ is the determinant of $Q_1$, it follows from the definition of $\hat{Q}_1$ that the i-th column of $Q_1^{-1}$ is completely null, except for its element at row j (that is not necessarily equal to 1, except for the binary case). So, the i-th column of $Q_1^{-1}$ has the effect of a column permutation (apart from multiplication by a constant), like in the original McEliece cryptosystem. In order to avoid such a case, it should preferably be imposed that all the elements of b are non-zero.

Such condition could not be sufficient in the binary case, for which it translates into having b that is the all-one vector. In this case, if a is an all-one vector too, i.e., R=1. It is known that a binary matrix $Q_1=1+P_1$ is invertible only when it has even size and, in such case, it can be shown that its inverse has the form $Q_1^{-1}=1+P_1^T$, due to the property of permutation matrices (as orthogonal matrices) to have their inverse coincident with the transpose.

So, $Q_1^{-1}$ has the same form of $Q_1$ and disclosing $G' = S^- \cdot G \cdot Q_1^{-1}$ might imply disclosing a generator matrix of a permuted version of the secret code or its complementary (depending on the parity of its row weight). Therefore, the form $Q_1=1+P_1$ might reduce the security to that of the permutation used in the original McEliece cryptosystem.

Restricting to the binary case with Q in the special form of Eq. (7), even adopting a vector a different from the all-one vector would not suffice to guarantee increased security with respect to the classical McEliece cryptosystem. Since $Q_1^{-1}=\hat{Q}_1/|Q_1|$, it is easy to verify that a weight-1 row in $Q_1$ produces a weight-1 row in $Q_1^{-1}$ and a weight-(n−1) row in $Q_1$ produces a weight-(n−1) row in $Q_1^{-1}$. It follows that $Q_1^{-1}$ contains couples of columns having Hamming distance 2. Since their sum is a weight-2 vector, the sum of the corresponding columns of the public matrix results in the sum of two columns of $S^{-1}$ G. Starting from this fact, an attacker could try to solve a system of linear equations with the aim of obtaining a permutation-equivalent representation of the secret code, at least for the existing distance-2 column pairs.

So, in the special case of the binary field, it is preferable to avoid the choice of Q as in (Eq. 7). A better choice of Q is obtained by using an R matrix with rank z>1 and by adding more than one permutation matrix to it (i.e. m>1).

Comparison with Full Decoding Cryptosystems

Cryptosystems based on full decoding [15], [16] aim at increasing the hardness of the basic problem and, for this purpose, a transformed set of intentional error vectors must be adopted, thus requiring to partially disclose the secret transformation. In contrast, the system according to the present invention still bases its robustness on the same problem as the original McEliece cryptosystem (that is, normal decoding); so, the error vectors are the same used in the original McEliece cryptosystem, apart from an optional selection of them, while no transformation of the error vectors is needed. For this reason, the information leakage on the secret transformation that is needed in the cryptosystem according to the present invention is considerably lower with respect to what happens in full decoding cryptosystems. In the first version of full decoding cryptosystem [15, sec. 8.3], p rows of the secret transformation matrix were made public. In the system according to the present invention, the secret transformation matrix may be chosen as in Eq. (4), with R as in Eq. (5), and only a can be disclosed or, even more notably, no error constraint can be needed when the legitimate receiver exploits a set of iterated decryption attempts.

Niederreiter Implementation

The cryptosystem object of the present invention can be alternatively implemented through the Niederreiter variant of the McEliece cryptosystem [4], that is able to exploit shorter public keys with respect to the classical McEliece implementation.

When the Niederreiter implementation is preferred, the first part of the public key is an r×n parity-check matrix H' of the form $$H'=S^{-1} \cdot H \cdot Q^T, \quad (\text{Eq. 9})$$

where the matrix S is a non-singular r×r matrix over GF(p), the matrix H is an r×n parity-check matrix of the private (n, k) linear block code over GF(p) and matrix Q is a non-singular n×n matrix as in (Eq. 4).

In this case, the ciphertext x has size r×1 and is obtained from the cleartext u by mapping u into a 1×n weight t error vector e and calculating its syndrome x through H', that is:

$$x=H' \cdot e^T. \quad (\text{Eq. 10})$$

Vector e may be optionally selected among the weight t error vectors verifying the condition $e \cdot R=0$.

When the ciphertext is received by the legitimate receiver, it is multiplied by S, so obtaining:

$$x'=S \cdot x = H \cdot Q^T \cdot e^T = H \cdot R^T \cdot e^T + H \cdot T^T \cdot e^T \quad (\text{Eq. 11})$$

Performing syndrome decoding on x' (or on a vector derived from x', when no selection of the error vectors is performed) with the secret linear block code (represented by H) allows to obtain the vector $T^T \cdot e^T$, that is then multiplied by $(T^T)^{-1}$, so recovering e. The latter can be hence demapped into its associated cleartext vector u.

EXAMPLE 1

Instance with 80-Bit Security

The security level is commonly measured as the number of elementary operations (or work factor) of the most efficient attack. With reference to Ref [3], to reach a security level $>2^{80}$, the (1632, 1269) Goppa code is suggested, resulting in a public-key size of 460647 bits (that is the lowest possible value for this code, obtained by storing the non-systematic part of H, as in the Niederreiter cryptosystem). With the variant according to the present invention, we can include the RS code with n=255, k=195, t=30, having a security level of $2^{84.18}$ (estimated as the work factor of the attack procedure described in [17]). The public key size for this code, if we store the 195×255 matrix G' and a 1×255 vector a, both with elements over GF(256), is $(195+1) \cdot 255 \cdot 8 = 399840$ bits, that is, about 13% less than (the minimum size of) that obtained by the revised McEliece cryptosystem [3]. By exploiting the Niederreiter variant of the system according to the present invention, a systematic H' can be used as the public key, and it can be represented by only storing its non-systematic part, that is, 95640 bits. This results in a reduction of about 79% with respect to the Goppa-based solution. The security level of the two systems remains comparable even when the constraint expressed by a is imposed on the intentional error vectors of the modified cryptosystem. In fact, the introduction of each constraint results in a decreased security level of about $2^3$.

EXAMPLE 2

Instance with High Security

We consider the Goppa code suggested in Ref [3] to achieve a security level $\geq 2^{128}$ which has n=2960, k=2288, yielding a key length of 1537536 bits. In the system according to the present invention, we can adopt an RS code with the same rate (0.77), defined over GF(512), having n=511, k=395, t=58. The corresponding size of the public key, including a 1×511 vector a, is $(395+1) \cdot 511 \cdot 9 = 1821204$ bits (that is slightly bigger than the one in the Niederreiter system proposed in Ref [4]). By exploiting the Niederreiter variant of the system according to the present invention, a systematic H' can be used as the public key, and it can be represented by only storing its non-systematic part, that is, 416979 bits. This results in a reduction of about 73% with respect to the Goppa-based solution. Furthermore, by using the present solution, the security level grows up to 2155.89 (estimated on the basis of the attack procedure described in Ref [17]). This value remains very high even when we consider the presence of the constraint expressed by a on the intentional error vectors.

Vulnerability to Subcode Attacks

In some of the above examples, the matrix R was chosen as $R=a^T \cdot b$, and the intentional error vectors were restricted to only those vectors satisfying the condition $a \cdot e^T=0$, meaning that the matrix a had to be disclosed as part of the public key. Such a choice was made both for the scheme which follows the original McEliece scheme, and for the Niederreiter variant.

It can be shown that such a setting exposes a subcode of the public code that is permutation-equivalent to a subcode of the private code. In fact, referring to the Niederreiter variant, an attacker could consider the subcode generated by the following parity-check matrix:

$$H'' = \begin{bmatrix} H' \\ a \end{bmatrix} \quad (\text{Eq. 12})$$

$$= \begin{bmatrix} S^{-1} \cdot H \cdot Q^T \\ a \end{bmatrix}$$

$$= \begin{bmatrix} S^{-1} \cdot H \cdot R^T + S^{-1} \cdot H \cdot T^T \\ a \end{bmatrix}.$$

Each codeword c in the code defined by H" must fulfil the condition $a \cdot c^T=0$. This also implies $R^T \cdot c^T=0$; so, matrix H" selects those codewords c such that $S^{-1} H \cdot T^T \cdot c^T=0$. Hence, the effect of the dense R is removed and, when T is a permutation matrix, the subcode defined by H" is permutation-equivalent to a subcode of the secret code.

In such case, when RS codes are used, an attacker could implement an attack of the type described in Ref. [6]. For practical choices of the system parameters, it seems that the subcode resulting by the inclusion of matrix a in H" is always weak against such attack.

Based on these premises, some possible countermeasures can be designed, that are able to make the system more robust against this kind of attacks, by trading an increased security level for a higher complexity of the decryption stage. The rationale of these variants is:

1. Breaking the straight connection between R and the public representation of the error constraints.
2. Exploiting the secret nature of the vector b, which is uninfluent when $R=a^T \cdot b$ and $a \cdot e^T=0$.

First Countermeasure

By referring to the case in which a is a vector (but the method can also be used when a is a matrix), a first countermeasure consists in splitting the constraint vector a into two (or more) subvectors. One may consider the case of splitting into two subvectors by choosing $$a=a_1+a_2.$$

The constraint vector a is still made public, but the condition on the error vectors is changed into $$a \cdot e^T = 1.$$

(This may be generalized to $a \cdot e^T = \gamma$, wherein $\gamma$ is an element of $GF(p)$). Alternatively, the constraint vector a can be kept secret. In this case, the value of $a \cdot e^T$ must be guessed by the legitimated receiver and decryption must be tried with all the possible values of $a \cdot e^T$, until success.

In order to break its connection with a, the matrix R is modified as follows:

$$R = \begin{bmatrix} a_1 \\ a_2 \end{bmatrix}^T \cdot \begin{bmatrix} b \\ 1-b \end{bmatrix}, \quad \text{(Eq. 13)}$$

where 1 is the all-one 1×n vector.

With R in the form (Eq. 13), the value of $R^T \cdot e^T$ can easily be obtained starting from the value assumed by $a_i \cdot e^T = \alpha$. In this case, $a_2 \cdot e^T = 1-\alpha$ and $$R^T \cdot e^T = \alpha b^T + (1-\alpha)(1-b)^T. \quad \text{(Eq. 14)}$$

This may also be generalized to the case in which, in the place of 1−b, a further secret vector d is introduced, that must be randomly chosen.

By knowing (or guessing, as can be seen in the following) the value of a, the authorized receiver can exploit the knowledge of b (and of d, if used in the place of 1−b) to calculate $R^T \cdot e^T$ and decrypt the received ciphertext.

Concerning the attack, with R in the form (Eq. 13), the matrix H" as in (Eq. 12) no longer defines a subcode which is permutation-equivalent to a subcode of the secret code, so the original version of the attack is prevented.

However, Eve could try to sum, at random, two rows of H", hoping that one of them corresponds to a copy of the vector $a_1$ in R and the other to a copy of the vector $a_2$. In this case, the sum of the two rows would still contain the vector a, so being suitable for the selection of the weak subcode. However, this approach would produce, on average, only $r/2=(n-k)/2$ rows containing vector a, while the others would contain $2a_1$ or $2a_2$. Furthermore, the sum of couples of rows would also imply to sum couples of rows of $T^T$; so, their (very low) weight would be doubled with a very high probability.

For these reasons, it seems not possible to devise a variant of the subcode attack able to be successful on this modified setting.

In order to describe how the decryption stage must be modified according to this new variant, a distinction will be made between the binary and non-binary cases in the following.

In the binary case, according to (Eq. 14), $R^T \cdot e^T$ can only assume two values:

$$\begin{cases} \alpha = 1 \Rightarrow R^T \cdot e^T = b^T, \\ \alpha = 0 \Rightarrow R^T \cdot e^T = (1+b)^T. \end{cases}$$

Suppose that Bob first computes $x'=S \cdot x=H \cdot Q^T \cdot e^T = H \cdot R^T \cdot e^T + H \cdot T^T \cdot e^T$ and then, by guessing that $\alpha=1$, he computes $x_1''=x'H \cdot b^T$.

If it is actually $\alpha=1$, then $R^T \cdot e^T = b^T$ and $x_1''=H \cdot T^T \cdot e^T$. So, Bob can perform successful syndrome decoding on $x_1''$ to recover e. In order to verify that e is actually that transmitted by Alice, Bob can check its weight and also verify that $a_1 \cdot e^T = \alpha = 1$.

If instead $\alpha=0$, then $R^T \cdot e^T = (1+b)^T$ and $x_1''=H \cdot 1^T + H \cdot T^T \cdot e^T$. If the code is self-complementary, then $H \cdot 1^T = 0$ and Bob can proceed exactly in the same way as for $\alpha=1$. Otherwise, there are two possibilities: i) $x_1''$ does not correspond to any correctable syndrome, so decoding fails or ii) $x_1''$ corresponds to a correctable syndrome, so decoding results in an error vector e'. In the latter case, Bob can check the weight of e' and also verify whether $a_1 \cdot e'^T = \alpha = 1$. This suffices to detect that e' is not that transmitted by Alice. In such case, Bob knows that $\alpha=1$ and he must restart from $x_0'=x'+H \cdot (1+b)^T$.

By this procedure, the probability of an undetected error, that is, $e'=e$, is comparable to the probability of undetected error that is typical for the secret code. For the kind of codes considered in the cryptosystem, the probability of such an event is extremely low.

So, for the binary case, Bob is always able to distinguish between the two cases $\alpha=0$ and $\alpha=1$, and to correctly decrypt the secret message. By using the proposed method, based on guessing the value of $\alpha$, Bob needs, on average, 1.5 decryption attempts on each received message. So, this variant of the cryptosystem, for the binary case, has decryption complexity increased, at most, by a factor $2^{0.6}$. Instead, if the code is self-complementary, Bob does not need to distinguish between $\alpha=0$ and $\alpha=1$; so, the decryption complexity remains unchanged.

For the case of $GF(p)$, there are obviously p possible values of $\alpha$. So, Bob needs to make up to p guesses on the value of $\alpha$.

First, Bob computes $x'=S \cdot x = H \cdot (R+T)^T \cdot e^T$. By using (Eq. 14), this results in $$x'=H \cdot T^T \cdot e^T + H \cdot [\alpha b^T + (1-\alpha)(1-b)^T] \quad \text{(Eq. 15)}$$

Then, Bob makes his first guess by supposing $\alpha = \alpha_B$ and calculates $$x'_{\alpha_B} = x' - H \cdot [\alpha_B b^T + (1-\alpha_B)(1-b)^T] \quad \text{(Eq. 16)}$$

By replacing (Eq. 15) in (Eq. 16) and by some simple arithmetics, one obtains $$x''_{\alpha_B} = H \cdot T^T \cdot e^T + 2(\alpha - \alpha_B) H \cdot b^T - (\alpha - \alpha_B) H \cdot 1^T. \quad \text{(Eq. 17)}$$

If $\alpha_B = \alpha$, then $x''_{\alpha_B} = H \cdot T^T \cdot e^T$; so, Bob can recover e through syndrome decoding, check its weight and verify that $a_1 \cdot e^T = \alpha_B$.

Otherwise, applying syndrome decoding on $x''_{\alpha_B}$ expressed by (Eq. 17) always results in a decoder failure or in obtaining $e' \neq e$, both in the case of self-complementary codes or not. The latter case can be detected by Bob by checking the weight of $e'$ and verifying that $a_1 \cdot e'^T \neq \alpha_B$.

So, the modified version can be used also in the non-binary case. Obviously, when working over GF(p), the average number of decryption attempts needed by Bob becomes $(p+1)/2$, that also gives a measure of the increase in the decryption complexity. Actually, some steps of the decryption procedure do not need to be repeated; so, an increase in the decryption complexity by a factor of $(p+1)/2$ is a worst case estimation.

Second Countermeasure

Starting from the constraint vector splitting approach described in the previous section, an even simpler countermeasure can be obtained, consisting in maintaining the original setting of the proposed cryptosystem (i.e. with $R=a^T \cdot b$), but hiding the constraint vector a. This obviously eliminates the need of selecting the intentional error vectors. This second countermeasure is illustrated for the case of a and b being two 1×n vectors, but can be generalized to the use of a and b in the form of two z×n matrices, with z>1.

Suppose that a is private and that the error vector e generated by Alice is such that $a \cdot e^T = \gamma$, with $\gamma \in GF(p)$. It follows that $$R^T \cdot e^T = \gamma b^T$$

and $$x' = S \cdot x = \gamma H \cdot b^T + H \cdot T^T \cdot e^T.$$

In this case, Bob can guess that the value of $\gamma$ is $\gamma_B$ and compute $$x'' = x' - \gamma_B H \cdot b^T \quad \text{(Eq. 18)}$$
$$= (\gamma - \gamma_B) H \cdot b^T + H \cdot T^T \cdot e^T.$$

So, if $\gamma_B = \gamma$, Bob obtains $x'' = H \cdot T^T \cdot e^T$. In such case, he can recover e through syndrome decoding, check its weight and verify that $a \cdot e^T = \gamma_B$. Otherwise, supposing that b is not a valid codeword, syndrome decoding fails or returns an error vector $e' \neq e$. This latter case can be identified by Bob by checking the weight of $e'$ and the value of $a \cdot e'^T$. The probability of finding $e' = e$, for $\gamma \neq \gamma_B$, is extremely low.

Also in this case, the complexity of the decryption stage is increased, on average, by a factor $\leq (p+1)/2$.

Whereas both the first and the second countermeasure have been described in the context of the Niederreiter variant of the proposed cryptosystem, these countermeasures are equally applicable to encryption and decryption following the scheme, described above, which is similar to the original McEliece scheme.

REFERENCES

[1] R. J. McEliece, "A public-key cryptosystem based on algebraic coding theory." DSN Progress Report, pp. 114-116, 1978.

[2] E. Berlekamp, R. McEliece, and H. van Tilborg, "On the inherent intractability of certain coding problems," IEEE Trans. Inform. Theory, vol. 24, no. 3, pp. 384-386, May 1978.

[3] D. J. Bernstein, T. Lange, and C. Peters, "Attacking and defending the McEliece cryptosystem," in Post-Quantum Cryptography, ser. Lecture Notes in Computer Science. Springer Berlin/Heidelberg, 2008, vol. 5299/2008, pp. 31-46.

[4] H. Niederreiter, "Knapsack-type cryptosystems and algebraic coding theory," Probl. Contr. and Inform. Theory, vol. 15, pp. 159-166, 1986.

[5] R. Overbeck, "Structural attacks for public key cryptosystems based on Gabidulin codes," Journal of Cryptology, vol. 21, no. 2, pp. 280-301, 2008.

[6] C. Wieschebrink, "Cryptanalysis of the Niederreiter public key scheme based on GRS subcodes," in Post-Quantum Cryptography: PQCrypto 2010, ser. LNCS, N. Sendrier, Ed. Springer, 2010, vol. 6061, pp. 61-72.

[7] V. G. Umana and G. Leander, "Practical key recovery attacks on two McEliece variants," in Proc. 2nd Int. Conf. on Symbolic Computation and Cryptography, C. Cid and J.-C. Faugere, Eds., Egham, UK, June 2010, pp. 27-44.

[8] C. Monico, J. Rosenthal, and A. Shokrollahi, "Using low density parity check codes in the McEliece cryptosystem," in Proc. IEEE International Symposium on Information Theory (ISIT 2000), Sorrento, Italy, June 2000, p. 215.

[9] A. Otmani, J. P. Tillich, and L. Dallot, "Cryptanalysis of two McEliece cryptosystems based on quasi-cyclic codes," in Proc. First International Conference on Symbolic Computation and Cryptography (SCC 2008), Beijing, China, April 2008.

[10] M. Baldi, M. Bodrato, and F. Chiaraluce, "A new analysis of the McEliece cryptosystem based on QC-LDPC codes," in Security and Cryptography for Networks, ser. Lecture Notes in Computer Science. Springer Berlin/Heidelberg, 2008, vol. 5229, pp. 246-262.

[11] E. M. Gabidulin, A. V. Paramonov, and O. V. Tretjakov, "Ideals over a noncommutative ring and their application in cryptography," D. W. Davies, Ed., Advances in Cryptology—EUROCRYPT 91, Lecture Notes in Computer Science, vol. 547, pp. 482-489, 1991.

[12] T. P. Berger and P. Loidreau, "How to mask the structure of codes for a cryptographic use," Designs, Codes and Cryptography, vol. 35, pp. 63-79, 2005.

[13] A. Ourivski and E. Gabidulin, "Column scrambler for the GPT cryptosystem," Discrete Applied Mathematics, vol. 128, pp. 207-221, 2003.

[14] H. Rashwan, E. M. Gabidulin, and B. Honary, "Security of the GPT cryptosystem and its applications to cryptography." Security Comm. Networks, 2010.

[15] G. Kabatiansky, E. Krouk, and S. Semenov, Error Correcting Coding and Security for Data Networks: Analysis of the Superchannel Concept. John Wiley & Sons, 2005.

[16] K. Lee, T. Jung, E. Krouk, S. Bezzateev, A. Fomin, "Data encryption and decryption method using a public key", United States Patent Application 20050117745, Assignee Samsung Electronics Co. Ltd., February 2005.

[17] C. Peters, "Information-set decoding for linear codes over $F_q$," in Post-Quantum Cryptography, ser. Lecture Notes in Computer Science, N. Sendrier, Ed. Springer Berlin/Heidelberg, 2010, vol. 6061, pp. 81-94.

The invention claimed is:

1. A method for encrypting a message for transmission through a communication medium in encrypted form, the method comprising:
receiving a public key comprising at least a first part, the first part being a representation of a transformed (n, k) linear block code with length n and dimension k over a finite field GF(p), p being a positive integer, obtainable from a private (n, k) linear block code over GF(p) by a transformation using a non-singular scrambling matrix S and a non-singular n×n matrix Q having the form $$Q = R + T,$$

wherein the matrix R is a rank-z matrix, and the matrix T is some other matrix rendering Q non-singular, the matrices S, R and T having elements in GF(p); wherein k and n are positive integers;

wherein the rank-z matrix R is derived from two z×n matrices, a and b, z being a positive integer with z<n, and wherein the rank-z matrix R is a product of two z×n matrices, a and b, according to the formula $R=a^T \cdot b$;

generating an error vector e having elements in GF(p), having a predetermined weight t; and encrypting a cleartext message represented by a cleartext vector u having elements in GF(p) to obtain a ciphertext vector x, wherein said encryption involves application of said transformed block code under use of said error vector e.

2. The method of claim 1, wherein the first part of the public key is a k×n generator matrix G' of the transformed block code taking the form $$G'=S^{-1} \cdot G \cdot Q^{-1},$$

where the matrix S is a non-singular k×k matrix, and the matrix G is a k×n systematic generator matrix of the private (n, k) linear block code, the matrix G having elements in GF(p), and the ciphertext vector is obtained from the cleartext vector by carrying out the following operation:

$$x=u \cdot G'+e.$$

3. The method of claim 1, wherein the first part of the public key is a r×n parity-check matrix H' of the transformed block code of the form $$H'=S^{-1} \cdot H \cdot Q^T,$$

where the matrix S is a non-singular r×r matrix, with r=n−k, the matrix H is an r×n parity-check matrix of the private (n, k) linear block code, the matrix H having elements in GF(p), and the ciphertext vector x is obtained from the cleartext vector by mapping the cleartext vector into a weight t error vector e and calculating its syndrome x through H' according to $$x=H' \cdot e^T.$$

4. The method of claim 1, further comprising:
transmitting said ciphertext vector x through said communication medium.

5. The method of any of claim 1, further comprising:
receiving the ciphertext vector x from the communication medium; and
decrypting the ciphertext vector x to obtain the cleartext vector u by using a private key comprising the private linear block code.

6. The method of claim 1, wherein $a=a_1+a_2$, with $a_1$ and $a_2$ being two z×n matrices, and wherein $$R = \begin{bmatrix} a_1 \\ a_2 \end{bmatrix}^T \cdot \begin{bmatrix} b \\ d \end{bmatrix},$$

where d is a z×n matrix.

7. The method of claim 6, wherein d=1−b, where 1 is an all-one z×n matrix.

8. The method of any of claim 1, wherein the public key further comprises a second part, the second part representing z error constraints, z being a positive integer with z<n, and wherein the error vector fulfils said z error constraints.

9. The method of claim 8, wherein the error constraints are equivalent to a condition e·R=0.

10. The method of claim 1, wherein the matrix a represents the z error constraints, being equivalent to the condition $a \cdot e^T=0$.

11. The method of claim 1, wherein the matrix a represents the z error constraints, being equivalent to the condition $a \cdot e^T=\gamma$, with $\gamma \in$ GF(p).

12. The method of claim 9, wherein the second part of the public key is the matrix a.

13. The method of claim 1, wherein the private linear block code is a quasi-cyclic (QC) linear block code, n k and r are multiples of a positive integer q ($n=n_0 \times q$, $k=k_0 \times q$, $r=r_0 \times q$) and matrices S, R, T and, where applicable, G or H are formed by circulant sub-matrices with size q×q, a circulant matrix being a square matrix in which each row is obtained through a rightwards cyclic shift of the previous row by one position.

14. The method of claim 1, wherein the matrix T is a sum of m generalized permutation matrices $\Pi_i$, i=1, . . . , m, m being a positive integer, each generalized permutation matrix $\Pi_i$ having only one non-zero element in each row and column, whose value is selected among the p−1 non-zero elements of GF(p).

* * * * *